United States Patent [19]

Sondhe et al.

[11] Patent Number: 5,340,652
[45] Date of Patent: Aug. 23, 1994

[54] ARTICLE COATED WITH INTERMINGLED EPOXY AND URETHANE LAYERS

[76] Inventors: Ratanjit S. Sondhe, 114 Anglers Dr., Chagrin Falls, Ohio 44022; Hemant A. Naik, 9965 Darrow Park Dr., #104F, Twinsburg, Ohio 44087; Shirish A. Pandit, 1796-C Treetop Trail, Akron, Ohio 44313; Bipin C. Pant, 1 Improvement Trust Bldg., Havelock Rd., Lucknow 226001 U.P., India

[21] Appl. No.: 165,741

[22] Filed: Dec. 10, 1993

Related U.S. Application Data

[63] Continuation of Ser. No. 791,887, Nov. 13, 1991, abandoned.

[51] Int. Cl.$^5$ ............................................. B32B 27/38
[52] U.S. Cl. ..................................... 428/413; 428/325; 428/414; 428/425.5; 428/425.8; 428/908.8
[58] Field of Search ............ 428/325, 413, 414, 425.5, 428/425.8, 908.8

[56] References Cited

U.S. PATENT DOCUMENTS

| | | | |
|---|---|---|---|
| 3,136,737 | 6/1964 | Kampschmidt | 525/247 |
| 4,088,633 | 5/1978 | Gurney | 528/99 |
| 4,554,214 | 10/1985 | Ichinomiya et al. | 428/423.1 |
| 4,689,268 | 7/1986 | Meader, Jr. | 428/413 |
| 4,699,814 | 10/1987 | Vu et al. | 427/407.1 |
| 4,732,790 | 3/1988 | Blackburn et al. | 427/407.1 |
| 4,758,469 | 7/1988 | Lange | 428/325 |
| 4,837,069 | 6/1989 | Bescup et al. | 428/148 |
| 4,855,185 | 8/1989 | Vu et al. | 428/423.1 |
| 4,859,735 | 8/1989 | Vu | 524/780 |
| 4,877,829 | 10/1989 | Vu et al. | 524/729 |
| 4,937,127 | 9/1988 | Haenggi et al. | 428/148 |

OTHER PUBLICATIONS

Ferrell, Victor, "Concrete coatings combine compliance with performance" *Modern Paints and Coatings,* vol. 81, (11), 1991, pp. 48–50, CA: 116(20) 1962916 Abstract.

*Primary Examiner*—John Kight, III
*Assistant Examiner*—Richard Jones
*Attorney, Agent, or Firm*—Hudak & Shunk Co.

[57] ABSTRACT

An article generally comprises an epoxy base coat and a urethane top coat which has particular use for application. The epoxy composition is generally a two-part, 100 percent volatile-free system containing one or more hardeners which are reacted with an epoxy component such as the glycidyl ether of bisphenol-A. The urethane composition is also generally a two-part, 100 percent volatile-free system containing a polyisocyanate component and an intermediate component comprising a polylactone polyol, and/or a polyether polyol, a polyester polyol, or a polyether-ester polyol, an aliphatic polyol chain extender and a moisture scavenger. The two-part epoxy composition can be applied to a road with the urethane composition coated thereon whereupon it serves as a lane marker. The urethane composition has exceptional weatherability, abrasion-resistance and non-yellowing characteristics. Various reflective compounds such as glass beads can be applied thereto which are partially embedded therein and have good night as well as wet night reflective properties.

34 Claims, No Drawings

ARTICLE COATED WITH INTERMINGLED EPOXY AND URETHANE LAYERS

CROSS-REFERENCE

This is a continuation of application Ser. No. 07/791,887 filed Nov. 13, 1991, now abandoned, of R. S. Sondhe et al., for "An Epoxy Composition, A Urethane Composition, and An Article Thereof".

FIELD OF THE INVENTION

The present invention relates to generally a volatile-free, two-part, epoxy composition, and to generally a volatile-free, two-part, urethane composition, and to an article made therefrom by generally coating the urethane composition on the epoxy composition.

BACKGROUND OF THE INVENTION

U.S. Pat. No. 3,136,733 to Ross et al relates to highway marking material adapted for marking pavements of roads, streets, highways, aircraft landing strips, and the like, for defining traffic lanes, pedestrian crosswalks, traffic instructions, and the like.

U.S. Pat. No. 4,554,214 to Ichinomiya et al relates to a polyurethane type casting coating which is used as labelling materials in labels, stickers, outdoor signs, reflective refractors, light road markings or automobiles.

U.S. Pat. No. 4,689,268 to Meader, Jr. relates to a concrete surface coated with a cast in place surfacing composition comprising at least three layers, in order from the concrete surface:

a first layer comprising:
1) a hard, epoxy resin, and
2) an inert, organic filler material consisting essentially of hollow ceramic beads;

a second layer comprising a bonding agent which improves adhesion between said first and third layers, and;

a third layer comprising: (1) 20 to 80 parts by weight of a polyurethane, said polyurethane formed by reacting a polyisocyanate with a polyurethane precursor at a mole ratio of 0.8 to 1.4:1, said polyurethane precursor comprising 15 to 60 parts by weight of a high molecular weight polyol and 2 to 10 parts by weight of a low molecular weight chain stiffener, (2) 20 to 80 parts by weight of a substantially non-volatile extender, and (3) 0 to 20 parts by weight of a volatile solvent.

U.S. Pat. No. 4,699,814 to Ambrose et al relates to an improved process of preparing color-plus-clear coatings, the improvement comprising an epoxy-functional polyurethane resin and high solids thermosetting coating compositions prepared therewith.

U.S. Pat. No. 4,732,790 to Blackburn et al relates to an improved process for preparing color-plus-clear coatings, the improvement comprising high solids thermosetting coating compositions comprising hydroxy-functional polyepoxides and anhydrides as effective curing agents therefor. Films of these coating compositions have low volatile organic content (VOC).

U.S. Pat. No. 4,758,469 to Lange relates to pavement marking comprising ceramic microspheres held by a binder, said microspheres being solid, transparent, non-vitreous, ceramic particles which serve as lens elements in the retro reflective pavement markings. The ceramic microspheres formed by various sol gel techniques are characterized by having at least one metal oxide phase; and an average minimum dimension of up to 125 micrometers.

U.S. Pat. No. 4,837,069 to Bescup et al relates to a procedure for making $Al_2O_3$ spheroids, 600 micrometers in diameter or less, utilizing an AlOOH sol containing 0.25 percent weight percent MgO (in the form of $Mg(NO_3)_2 \cdot 6H_2O$) and $HNO_3$. The sol is dispersed into droplets in a particle forming fluid (e.g., 2-ethylhexanol) where gelling occurs. The gelled spheroids are collected, dried and pre-fired in air at temperatures less than 1,200° C. for up to about 12 hours. The dried and prefired beads are fired in a 2-step process at temperatures of about 1,850°–1,950° C. in the following sequence: a first dry oxygen firing for about ten minutes, followed by a wet hydrogen firing for up to 350 minutes. Reasonably transparent microspheres having crystallites in the range of 5–100 micrometers are obtained with little intergranular porosity, and their density is estimated to be near theoretical.

U.S. Pat. No. 4,855,185 to Vu et al relates to novel polyurethane formulations especially useful as membranes for the protection of bridge deckings. The polyurethane is prepared by mixing two components, A and B. Component A consists essentially of a low molecular weight polyol, e.g., glycerol; a poly(oxypropylene) triol; and an elastomer. Component B is a special MDI, either a mix of 4,4'- and 2,4'-isomers of diphenylmethane diisocyanate or a mix of 4,4'-diphenylmethane diisocyanate and its reaction product with a low molecular weight poly(oxypropylene).

U.S. Pat. No. 4,859,735 to Vu relates to novel polyurethane formulations especially useful as membranes of the protection of bridge deckings. The polyurethane is prepared by mixing two components, A and B. Component A comprises castor oil modified with a ketone-formaldehyde condensate and also preferably contains an elastomer. Component B is a modified MDI, being a mixture of diphenylmethane diisocyanate and its reaction product with a low molecular weight poly(oxyalkylene).

U.S. Pat. No. 4,877,829 to Vu et al relates to novel polyurethane formulations especially useful as membranes for the protection of bridge deckings. The polyurethane is prepared by mixing two components, A and B. Component A comprises castor oil, a low weight polyol having a molecular weight between 92 and about 200, preferably with an elastomer. Component B is a modified MDI, being either (i) a mix of 4,4'- and 2,4'-isomers of diphenylmethane diisocyanate or (ii) a dephenylmethane diisocyanate and its reaction product with a low molecular weight poly(oxyalkylene).

U.S. Pat. No. 4,937,127 to Haenggi et al relates to a skid-resistant pavement marking sheet including a top surface and a plurality of skid-resistant ceramic spheroids embedded in and protruding from the surface. The ceramic spheroids are fired from a raw material mixture including 10–97 weight percent mineral particulates, 3–90 weight percent alumina, and at least 1 weight percent binder, at a temperature of about 1300° C., have an outer surface rich in alumina concentration relative to the center of the spheroid, and are resistant to crushing and fracturing.

SUMMARY OF THE INVENTION

It is an aspect of the present invention to provide a novel epoxy composition which is generally volatile free. This composition is the reaction product of a epoxy resin, or combination of one or more resins combined with a hardener or a hardener system. The hardener can be an amine hardener such as an aliphatic or aromatic amine hardener, an anhydride hardener or a mercaptan hardener, etc. It is preferable that the hardener is an amine or mercaptan. An amine hardener system comprised of more than one amine hardener is most preferred. Preferably the amine hardener system is reacted with the epoxy resin at a equivalent ratio of from about 0.75 to about 1.05, and more preferably at from about 0.9 to about 1.0. The epoxy resin may include a base resin, along with an epoxy resin diluent for the reduction of the viscosity. Further, the resin may contain other additives, such as pigment, thixotropic agents, defoamers, and the like.

The amine hardener system comprises one or more amine hardeners which are aliphatic, cycloaliphatic and/or adducts of the same. These hardeners are used at from about 15 to about 40 percent by weight of a first amine hardener (based on the total weight of the amine hardener system), which is an amino alkyl piperazine having from about 1 to about 4 carbon atoms in said alkyl group and an alkyl phenol having from about 1 to about 12 carbon atoms in said alkyl group; from about 45 to about 60 percent by weight of a second amine which is an amine derivative of ethylene, and from about 10 to about 25 percent by weight of a third amine which is an alkyl amino alkyl piperazine when all three hardeners are utilized. The hardener system further includes a catalyst which is preferably a dicarboxylic acid, and a plasticizer such as an aromatic alcohol.

The epoxy composition in accordance with this invention has a low tack-free time, appropriate color and resistance to discoloration, appropriate viscosity, adhesion to various substrates including concrete, asphalt, polyurethane and glass beads, and desirable physical properties such as good impact strength compressive and tensile strength and good abrasion resistance. Further, the epoxy provides volatile free or substantially volatile free epoxy for use in road lane markers.

The urethane composition is generally a two-part liquid system substantially free of any solvents and contains one or more polyisocyanates and one or more hydroxyl terminated intermediates. Desirably the polyisocyanate is a diisocyanate and the equivalent ratio of isocyanate groups to hydroxyl groups of the intermediate is generally from about 0.9 to about 1.5. At least some of the hydroxyl terminated intermediates have a functionality greater than two such as trifunctional compounds so that upon reaction with a diisocyanate, a cured branched or crosslinked polyurethane composition is produced. Moisture scavengers such as latent polyamines can also be utilized along with various catalysts and pigments. Cure generally occurs at ambient temperature. The urethane provides good weathering resistance, good abrasion resistance, good flexibility, good tensile strength and low viscosity.

An article is made by coating the urethane composition on the epoxy composition which generally serves as a base layer. The urethane, which is generally applied before the epoxy is fully cured and will typically bleed into, intermingle, mechanically bound, etc. with a portion of the epoxy substrate. Thus, a composite is formed from the epoxy and the urethane in which the layers are chemically fused and the layers subsequently have substantially no discrete interface but rather the composite has an intermediate section in which one or more compounds of the epoxy resin and/or hardener may join the respective polymeric units of both layers. This can generally be understood to be a form of or at least analogous to chemical bonding, to crosslinking and/or mechanically bonding between the layers. The epoxy layer generally serves as an excellent binder to the substrate as well as to optional reflective additives, i.e., glass beads, whereas the urethane layer has good abrasion resistance and good weatherability and thus can be used as a road lane marker. The combination of the epoxy and the urethane have the additional advantage that since both layers are free from volatiles, such as solvents, the final article is likewise free from volatiles. This is an advantage in the application of the laminate since it eliminates volatiles which could be hazardous to the environment or the workers who apply the laminate to the substrate surface.

Further, glass beads are added after application of the urethane layer in order to provide excellent nighttime and wet night reflectivity.

DETAILED DESCRIPTION OF THE INVENTION

Articles in the form of a laminate or coated substrates are formed by generally adding a layer of the urethane composition to the epoxy composition. The epoxy composition has good bonding to surfaces such as industrial floors, garage decks, i.e. concrete and steel structures, storage tanks, roads including concrete and asphalt and the like, and hence generally serves as the substrate interface or base layer. The urethane composition has good weatherability resistance as well as generally good abrasion resistance and therefore serves as a good durable top coat.

EPOXY COMPOSITION

An epoxy composition is provided which has a unique combination of hardeners in a hardener system which are used in a specified ratio in order to achieve the properties of this composition. This epoxy composition is generally a volatile-free system. By "volatile-free system" it is meant that the composition generally contains less than 10 percent by weight of volatile, desirably less than 1 percent by weight, preferably no volatile at all, that is 0 percent, or completely free from volatile which can be released from the composition as a volatile. In the past, such volatiles have often resulted from the use of solvent. Thus, the composition is substantially, or even 100 percent non-solvent at ambient temperature and upon cure is 100 percent solids. In other words, the term "volatile-free system" can be understood to be free from organic components which have a boiling point of less than 120° F. This is also known in the art as a 100 percent solids system. This advantage results in a composition which is safer and more environmentally benign than prior art compositions. Despite this advantage, the composition has an appropriate viscosity to permit application such as by spraying.

Epoxy compositions are generally formed by the mixing of two components, a part "A" comprising the epoxy resin, and a part "B" comprising the hardener system. The epoxy resin is reacted with a hardener system. In the invention, the preferred hardener is one or more amine hardeners as will be further discussed in greater detail. Such hardeners include, for example, aliphatic and aromatic amines, amine adducts, cycloaliphatic amines, mercaptans, polyamides, amido-amines, anhydrides and the like. In the present invention, one or more epoxy resin can be used as the base resin with an optional epoxy modifier and other additives.

Examples of specific epoxy resins or polymers which can be utilized include but are not limited to polyhydric phenol polyether alcohols; glycidyl ethers of novolac resins such as epoxylated phenol-formaldehyde novolac resin; glycidyl ethers of mono-, di-, and trihydric phenols; glycidyl ethers of bisphenols such as diglycidyl ether of tetrabromobisphenol A; glycidyl ethers of polynuclear phenols; epoxy resin made from diphenolic acid; glycidyl ethers of aliphatic polyols such as chlorine-containing aliphatic diepoxy and polyepichlorohydrin; glycidyl esters such as aliphatic diacid glycidyl esters and epoxidized phenolphthalein; glycidyl epoxies containing nitrogen such as glycidyl amides and amide-containing epoxies; glycidyl derivatives of cyanuric acid; glycidyl resins from melamines; glycidyl amines such as triglycidyl ether amine or p-aminophenol and bis(2,3-epoxypropyl)methylpropylammonium p-toluenesulfonate; glycidyl triazines; thioglycidyl resins such as epoxidized bisulfide; silicon-glycidyl resins such as 1,4-bis[(2,3-epoxypropoxy)dimethylsilyl]; and fluorine glycidyl resins. Other epoxy resins which can be used include those which are synthesized from monoepoxies other than epihalohydrins including epoxy resins made from unsaturated monoepoxies such as polyallyl glycidyl ether and glycidyl sorbate dimer; epoxy resins from monoepoxy alcohols; epoxy resins from monoepoxies by ester interchange; epoxy resins from glycidyaldehyde; polyglycidyl compounds containing unsaturation such as allyl-substituted diglycidyl ether of bisphenol A; epoxy-resin adducts of the above; and epoxy resins which are synthesized from olefins and chloroacetyls such as butadiene dioxide, vinylcyclohexane dioxide, epoxidized polybutadiene, and bis(2,3-epoxy-cyclopentyl)ether. A more comprehensive list of epoxy resins can be found in *Handbook of Epoxy Resins*, by Henry Lee and Kris Neville, McGraw-Hill, Inc., 1967, which is hereby incorporated by reference.

The various epoxy resins or polymers which are generally applicable to the present invention as the base epoxy resin have a number average molecular weight of from about 300 to about 5,000, and preferably from about 320 to about 390. The various epoxy polymers useful for the basic epoxy resin generally are difunctional, that is, they have two epoxide groups typically at the terminal portions thereof.

A highly preferred base epoxy resin is diglycidyl ether of bisphenol A (DGEBA) which has the following formula:

11,000 to about 14,000 centipoises. The resin should have a color APHA of from about 0 to about 200.

The epoxy resin can be used with a modifier such as for example a diluent. Broadly these diluents should have an epoxide equivalent weight range of 120-325. In the present invention it is preferable to use an alkyl glycidyl ether as the diluent with a suitable range being from 2 to 20 carbon atoms in the alkyl portion. More preferably, the alkyl portion contains 3 to 10 carbon atoms, with butylglycidyl ether being most preferred. Alternatively, the diluent may be a diepoxide such as butyldiglycidyl ether. Other diluents which are applicable in the present invention include cresyl diglycidyl ether having a weight equivalence of from about 160 to about 210, and more preferably from about 170 to about 195. In addition, epoxide fractions of $C_2$ to $C_{20}$ are useful with two specific fractions being in the range of $C_8$ to $C_{10}$ and in the range of $C_{12}$ to $C_{14}$ could be used. In addition, 2-ethylhexylglycidyl ether could be used. When butylglycidyl ether is used, it preferably has a weight per epoxide equivalence of from about 120 to about 220, and more preferably from about 130 to about 260.

In accordance with the present invention, the diluent is used in an amount sufficient to lower the viscosity of the epoxy resin to an appropriate number and will therefore of course depend upon the base resin used. A desired viscosity range for spray applications such as used in the present invention is from about 2,000 to about 15,000 centipoises at 77° F., and more particularly from about 3,000 to about 12,000 centipoises, and most desirably from about 4,000 to 5,000. When the base resin is bisphenol A and the diluent is butylglycidyl ether, a preferred amount of the diluent is from about 5 to about 15; preferably from about 8 to about 12; and most preferably from about 6 to about 10 parts by weight per 100 parts by weight of the epoxy base resin. The amount of the diluent added will also depend upon the amount appropriate for the addition of the pigmentation.

Other additives which can be used in the resin system include, for example, pigment. The pigment may be used, added in a desired amount, in a desired color such as for example 10 to 50; preferably 20 to 45 parts by weight per 100 parts by weight of the epoxy resins. For road marker applications in particular, a white pigment may be used which can include, for example, titanium dioxide, or a yellow pigment might be used which might include lead chromate. Of course, alternatively the epoxy can be clear, such as for a clear primer.

Other conventional additives known to the art and to

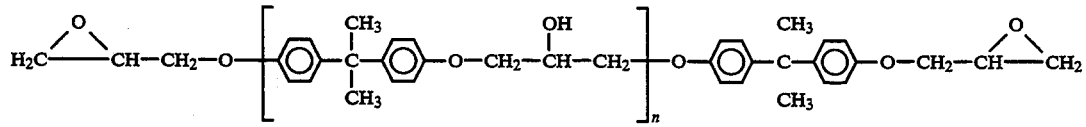

wherein n is an integer from 0 to 18, desirably from 0.05 to 3, and preferably from 0.1 to 2.

More particularly, the base epoxy resin useful for the present invention comprises a bisphenol A type resin, or a blend of bisphenol A resin and epichlorohydrin having a weight per epoxide ranging from about 175 to about 200, and more preferably from about 180 to about 195. The resin has a viscosity at 77° C. of from about 6,000 centipoise to about 18,000 centipoises, and more preferably from about 11,000 centipoises to about 16,000 centipoises and most preferably from about the literature can be utilized such as, for example, a thixotropic agent such as amorphous fumed silica, a defoamer, heat and light stabilizers, wetting and dispersing agents, antioxidants, and the like.

A hardener system is combined with the epoxy resin in order to produce the resultant epoxy composition. In the present invention, the hardener system utilizes one or more hardeners which could be an amine, an amidoamine, an anhydride or a mercaptan hardener. Examples of suitable mercaptans include generally mercaptan terminated polysulfides, such as LP32 and LP3 sold by Morton Thiokol, and Capcure ™ 3800 and Capcure ™ WR6 sold by Henkel. It is preferable that the hardener is one or more amine hardeners which is either aromatic or aliphatic. Suitable aromatic hardeners include methylene dianaline, diaminodiphenylsulphone, aromatic polyamine adducts based on methylenedianiline, modified aromatic adducts based on methylenedianiline and modified methylene dianiline, and m-phenylendiamine, its adducts and derivatives and polyamines, while aliphatic hardeners include alkyl and heterocyclic amines, and their adducts and derivatives. The hardener system preferably includes more than one hardener composition in a more preferred embodiment includes at least three compositions. Thus, when the system includes a two component system, the system may be 10 to 90 percent by weight of a first hardener and 10 to 90 percent by weight of a second hardener based on the total weight of both hardeners. When the system has three or more hardeners, the system has 5 to 90 percent of a first hardener, 5 to 90 percent of a second hardener, and from 5 to 90 percent of a third hardener. In an alternative embodiment, these amine hardeners are predominately, if not exclusively, aliphatic. The amine hardeners are used in an amount so that the gram equivalent ratio of the amine functionality to the epoxide functionality of the epoxy system is from about 0.75 to about 1.05, and more preferably from about 0.9 to about 1.0. In the present application, it is preferable that three amine hardeners are used in combination in the hardener system. In particular, when the epoxy is used with a white formulation, it may be preferable that these hardeners are at least substantially aliphatic amines since aromatic amines tend to discolor.

In a narrow embodiment, the first hardener amine (a) is a combination of an alkylphenol and a aliphatic amine which is an amino-alkyl cyclodiamine having the general formula

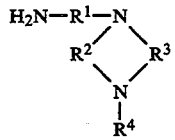

wherein $R^1$ is an alkyl having 1 to 20 carbon atoms, and preferably 1 to 8 carbon atoms; and $R^2$ and $R^3$, independently, form a heterocyclic alkyl each having 1 to 15 carbon atoms, and preferably 1 to 8 carbon atoms, and $R^4$ is hydrogen or $R^5NH_2$ or $R^6NHR^7$, where $R^5$ is alkyl $C_1$ and $C_{10}$ and preferably $C_1$ to $C_3$, and $R^6$ is alkyl $C_1$ to $C_{10}$ and preferably $C_1$ to $C_3$, and $R^7$ is alkyl $C_1$ to $C_{10}$ and preferably $C_1$ to $C_3$. An example of a preferred cycloamine is amino ethyl piperazine or bis-amino propyl piperazine. A commercial example of this is Ancamine ® 1644 sold by Pacific Anchor. Other examples would include imidazoles. This aliphatic amine is activated or modified, meaning that it is combined with an alkyl phenol having a 1 to 15 carbon alkyl, and preferably a 1 to 9 carbon alkyl, such as nonyl phenol. The combination may be an amine adduct.

The second amine hardener (b) is again a combination of an aliphatic amine with a phenol. The aliphatic amine could be an amine adduct. In this case the amine is a poly generic amine having the general formula

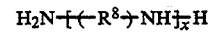

where Rrhu 8 is $(CH_2)_n$, where n is 1 or 2 to 30 and preferably about 2 to 12, and x is 1 to 10, preferably about 1 to 4. Preferred amines are diethylene triamine, methylenetetramine, diethylenepropylamine, tetraethylenepentaamine, and particularly preferred amines are diethylene triamine and triethylene tetramine. The phenol may include bisphenol A or bisphenol F and is preferably is bisphenol A. Again, the combination may result in an amine adduct. A commercial example of this is Versamine ® 912, sold by Henkel.

The third amine hardener (c) is preferably an alkyl amino alkyl cyclodiamine having the general formula

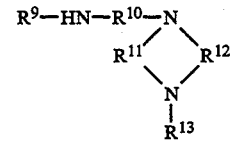

wherein $R^9$ is an alkyl having from about 1 to about 15 carbon atoms, preferably about 1 to about 10, most preferably nonyl; $R^{10}$ is an alkyl having from about 1 to about 15; preferably from about 1 to about 8 (e.g. ethyl) and $R^{11}$ and $R^{12}$ together with the two amine functionalities form a heterocyclic alkyl where $R^{11}$ and $R^{12}$, independently, each have from about 1 to about 15; and preferably from 1 to about 4 carbon atoms, and where $R^{13}$ is hydrogen, or $R14H_2$ or $R^{15}NHR^{16}$, where $R^{14}$ is alkyl $C_1$ to $C_{10}$, and preferably $C_1$ to $C_3$, and $R^{15}$ is alkyl $C_1$ to $C_{10}$, and preferably $C_1$ to $C_3$, and $R_{16}$ is alkyl $C_1$ to $C_{10}$, and preferably $C_1$ to $C_3$. Specific examples include nonylaminoethylpiperazineandbis-aminopropylpiperazine. A commercial example is Versamine ® 908, sold by Henkel.

The preferred amine hardeners are used in combination where, by weight, the first amine hardener (a) is from about 15 to about 40 percent; preferably from about 27 to about 37 percent; most preferably from about 29 to about 34 percent; the second amine hardener (b) is from about 45 to about 60 percent; preferably from about 46 to about 56 percent; most preferably from about 49 to about 53 percent, and the third amine hardener (c) is from about 10 to about 25 percent; preferably from about 12 to about 22 percent; most preferably from about 15 to about 20 percent, all of the foregoing percentages being by weight based on the total weight of a+b+c.

The hardener system further includes other additives. The total hardener in the system is from about 5 to about 90 percent and more narrowly from about 10 to about 70 percent. The remainder to equal 100 percent being the other additives. One of these additives is a catalyst which is generally a dicarboxylic acid and is preferably salicylic acid. This is used in an amount of from about 2 to about 10, and preferably from about 3.5 to about 5.5 per parts by weight per 100 parts by weight of amine hardener system a+b+c.

In addition, a plasticizer may be used which is a high boiling alcohol such as the aromatic alcohols, including for example, benzyl alcohol which has a boiling point of 401° F. This is used in an amount of from about 5 to about 25; and preferably from about 10 to about 20, most preferably 15 to 20 parts by weight per 100 parts of amine hardener system (i.e. based on the total weight of a+b+c). Further, a thixotropic agent may be used in an amount to achieve the desirable viscosity which is from about 3,000 to about 8,000, centipoises. This thixotropic agent is preferably fumed silica or silicon dioxide. It is added in an amount of from about 0.5 to 5 parts; preferably from about 1 to about 4 parts by weight per 100 parts amine hardener system (a+b+c).

The hardener system achieves an appropriate color depending on the application and in particular for road markers being white and yellow, a viscosity of from about 3,000 to about 20,000 centipoises, and further desirably physical properties, such as compression set and tensile elongation. It is desirable that the compressive strength is at least 5,000, and desirably from about 12,000 psi to about 14,000 psi as compressive strength as determined by ASTM D695, and the tensile strength is at least about 5,000, and more preferably at least 6000 psi as determined by ASTM D-638.

URETHANE COMPOSITION

The urethane composition is generally a liquid at ambient temperature, for example from about 10° C. to about 40° C., and preferably from about 15° C. to about 30° C. It is an important aspect of the present invention that the urethane composition be volatile-free, that is generally contains less than 10 percent by weight of volatiles therein, such as a solvent, desirably less than 1 percent by weight, and preferably no volatiles at all. Such compositions are generally described as a 100 percent solids composition. Another definition of the 100 percent volatile-free urethane system is that the system, before reaction, does not contain any components which have a boiling point of less than 120° F., even though it may be liquid. The urethane composition is the reaction of a two-part or component system, that is generally an intermediate component and a polyisocyanate component. Whenever it is desirable to prevent yellowing of the urethane composition, all components and compounds thereof are aliphatic.

Considering the intermediate component system, it can be a hydroxyl terminated lactone intermediate, and/or a hydroxyl terminated polyether, polyester, or a polyether-ester intermediate. The lactone based hydroxyl terminated compound can either be difunctional, trifunctional, tetrafunctional, or combinations thereof, for example, blends of a difunctional lactone based intermediate and a trifunctional based lactone intermediate, or the like. Hence, a lactone intermediate can have from about 2.0 to about 4.0 or preferably to about 3.0 hydroxyl groups per molecule. The hydroxyl terminated lactone intermediate is made from a lactone generally having from about 4 to about 8 carbon atoms with 6 carbons, that is caprolactone, being preferred. The lactone is typically reacted with a diol generally having from 2 to 8 carbon atoms and preferably from 2 to 6 carbon atoms to form the hydroxyl terminated lactone intermediate. Specific examples of such diols include ethylene glycol, propylene glycol, butylene glycol such as 1,4-butane diol, hexamethylene glycol, and the like with 1,4-butanediol being preferred. When either in combination with a diol, or when used by itself, a lactone triol intermediate can be generally made from a triol having from 3 to 12 carbon atoms, desirably from 5 to 8 carbon atoms, with specific examples including glycerol, trimethylol propane, and the like. A preferred triol is 2-ethyl-2-(hydroxymethyl)1,3 propane diol, i.e., trimethylol propane. Similarly, various tetraols known to the art and to the literature can be utilized to make the lactone polyol intermediate.

Inasmuch as desirably the lactone-based diol or triol intermediate is a liquid at ambient temperature, it generally has a low molecular weight as from about 200 to about 1,000, and desirably from about 275 to about 450. Alternatively, a solid lactone intermediate may be used if it is heated above its melting point, and uniformly dispersed prior to application. However, for ease of application, the lactone is preferably a liquid at ambient temperature.

In lieu of the polylactone intermediate, or in combination therewith, a polyol intermediate can be utilized which can either be a polyester polyol, a polyether polyol, or a polyester-ether polyol intermediate. These polyol intermediates are solvent-free. The polyether intermediate is generally made from oxyalkylene compounds having from 2 to 6 carbon atoms and preferably 2 or 3 carbon atoms, i.e. specific examples include ethylene oxide, propylene oxide, butylene oxide, and the like, with ethylene oxide and propylene oxide being preferred. The ester intermediate is generally made from glycols or triols having from about 2 to about 10 and desirably from about 2 to about 6 carbon atoms, with specific examples including ethylene glycol, propylene glycol, butylene glycol, hexamethylene glycol, trimethanol propane, and the like, with ethylene glycol and propylene glycol being preferred. The polycarboxylic acids such as a tri- or preferably dicarboxylic acids are utilized to form the ester intermediate is an aliphatic or cycloaliphatic generally containing from about 2 to about 12 carbon atoms or aromatic acids generally containing from about 8 to about 20 carbon atoms with specific examples including succinic acid, glutaric acid, adipic acid, pimelic acid, azelaic acid, phthalic acid, diphenolic acid, and the like, with adipic acid and succinic acid being preferred. Although a polyether polyol or a polyester polyol can be utilized, preferably a polyester-ether intermediate is utilized made from the above ester and ether forming polyol compounds and preferably a branched polyester-ether intermediate is utilized desirably having at least two hydroxyl end groups therein. Desirably, the mixed polyester-ether is multifunctional as containing from about 2.0 to about 3.0 hydroxyl groups therein and preferably is trifunctional. An example of a highly preferred mixed polyester-ether branch polyol intermediate is Desmophen TM 1155 manufactured by Mobay. This intermediate has a hydroxy number of approximately 168 and an equivalent weight of 333. The equivalent weight of the polyether, the polyester, or the polyether-ester intermediate is generally from about 190 to about 500 and preferably from about 300 to about 400.

The total amount of the various one or more polyol intermediates is generally from about 30 to about 75 parts by weight, desirably from about 40 to about 60 parts, and preferably from about 45 to about 55 parts by weight for every 100 parts by weight of the entire intermediate component.

The lactone based intermediate is preferred and if another polyol intermediate is utilized in association therewith, the amount thereof is up to about 50 percent; preferably up to about 10 percent; and most preferably up to about 6 percent by weight based upon the total weight of the lactone and the other (e.g. polyether polyol) intermediates.

The intermediate component also generally has a significant amount of one or more chain extenders which generally imparts stiffness to reacted urethane composition. Such chain extenders can be diols, triols, etc. having from about 2 to about 15 carbon atoms and preferably from about 2 to about 6 carbon atoms with specific examples including ethylene glycol, propylene glycol, butane diol, dipropylene glycol, diethylene glycol, glycerol, trimethylol propane diol, and the like, with the diols and specifically 1,4-butane diol being preferred.

The amount of the chain extender is generally from about 5 to about 25 parts, and more preferably from about 10 to about 20, and most preferably from about 14 to about 16 parts by weight for every 100 parts by weight of the entire intermediate component.

In addition to the polyol intermediate and the chain extender, optionally but desirably one or more water or moisture scavengers is utilized to generally provide a moisture free composition. Such moisture scavengers are generally known to the art as well as to the literature. A particular suitable moisture scavenger has been found to be a latent aliphatic polyamine which are generally the reaction of a diisocyanate with a hydroxyl terminated oxazolidine, such as

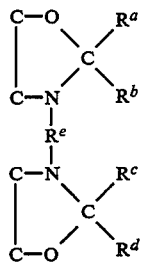

wherein $R^a$ $R^b$ $R^c$ $R^d$ and $R^e$, independently, are alkyl having from 1 to 6 carbon atoms, and the diisocyanate is $R(NCO)_2$, wherein R is an aliphatic or an aromatic, or combinations thereof, generally having from about 2 to about 20 carbon atoms with specific examples including isophorone diisocyanate, hydrogenated diphenylmethane diisocyanate (HMDI), hexamethylene diisocyanate (HDI), toluene diisocyanate, and the like, but diphenylmethane diisocyanate (MDI) is generally not utilized. A desirable latent amine moisture scavenger is sold under the tradename HARDENER OZ ™ by Mobay Chemical. Alternatively, anhydride water scavengers having a total of from 4 to 12 carbon atoms, and alkaline earth salts of such anhydrides, such as methylhexahydrophthalic anhydride sold under the tradename Luketherm ™ -M. Other anhydrides include acetic anhydride, propionic anhydride, butyric anhydride, valeric anhydride, hexanoic anhydrided, pivalic anhydride, and the like. Also molecular sieves which are generally crystalline aluminosilicates, crystalline aluminophosphates, etc. and are dispersed in a carrier oil, can be utilized. A specific example is Unisiv ™ paste sold by UOP.

The amount of the one or more water scavengers is generally from about 1 to about 8, and preferably from about 2 to about 6 and most preferably about 3.5 to about 4.5 parts by weight for every 100 parts by weight of the entire intermediate component.

The second part of the urethane composition, that is the polyisocyanate component, i.e. $R(NCO)_n$, wherein n is from 1 to about 4 and R can be an aliphatic polyisocyanate wherein R generally contains a total of from about 2 to about 20 carbon atoms and desirably from about 4 to about 10 carbon atoms. Aromatic polyisocyanates, that is aliphatic substituted polyisocyanates such as alkyl substituted polyisocyanates, aromatic substituted aliphatic polyisocyanates, etc. can also be utilized and R generally contains a total of from 6 to about 20 carbon atoms. The polyisocyanate is desirably a diisocyanate, although optionally up to 10 percent by weight of a tri or tetraisocyanate can be utilized. Examples of specific aliphatic diisocyanates include the various isophorone diisocyanates (IPDI), the various hexane diisocyanates such as 1,6-hexane diisocyanate, the various mixed trimethylhexane diisocyanates, the various pentamethylene diisocyanates, and the like. Hexamethylene diisocyanate and isophorone diisocyanate are preferred. The aliphatic polyisocyanates generally have a molecular weight of from about 150 to about 600 and an equivalent weight average of from 80 to about 400. Examples of aromatic diisocyanates include paraphenylene diisocyanate, 4,4'-dibenzyl diisocyanate, dianisidene diisocyanate, meta-phenylene diisocyanate, tolylene diisocyanate, bitolylene diisocyanate, 4,4'-methylenebisphenyl isocyanate (MDI), naphthalene diisocyanate, xylene diisocyanate, and the like with MDI being preferred. The aromatic polyisocyanates generally have a molecular weight of from about 100 to about 700 and an equivalent weight average of from 80 to 300. Although aromatic type diisocyanates generally give very good properties, they tend to "yellow" the urethane composition and, hence, in various situations where color or other optical properties are important, the aliphatic polyioscyanates aee preferred. The equivalent molecular ratio of NCO to OH of all of the various hydroxyl terminated intermediate compounds and chain extenders, etc., is generally a slight excess as from about 0.9 to about 1.5, desirably from about 1.02 to about 1.15, and preferably from about 1.05 to about 1.10. Ratios outside of this range generally yield a reacted product which is too flexible or too hard.

Various catalysts can be utilized such as dibutyl tin dilaurate, bismuth stearate, bismuth stannate, zinc octate, lead octate, cobalt naphthalates, and the like. The amount of such catalyst is generally small and can range from about 0 to about 2 parts by weight and preferably from about 0.1 to about 0.6 parts by weight for every 100 parts by weight of the hydroxyl containing intermediate component. In addition to promoting the reaction, the catalyst permit rapid cure at ambient temperature.

Various conventional additives in suitable amounts can be utilized in the intermediate component. Such additives include fillers such as clays, silicas, and the like, various antioxidants, various ultraviolet light inhibitors, air release agents, leveling agents, wetting agents, and the like, as well as pigments. With regard to road lane markers, the pigments utilized are generally titanium dioxide for white, and lead chromate and various organic pigments for yellow. Of course other pigments can be utilized.

Article or Laminate

The epoxy composition and the urethane composition of the present invention, as noted above, are generally utilized as a laminate or layer system to form an article having good binding strength to the substrate and yet good abrasion resistance and weatherability resistance which is supplied by the urethane composition. The articles or laminates of the present invention can be utilized as protective coatings for concrete floors, steel structures, storage tanks, including tanks containing corrosive material, road lane markers, and the like. These structures can be formed of various substrate materials including, for example, steel concrete and asphalt. Since the epoxy composition has good bonding strength, it is generally utilized as a base or substrate interface layer.

The two-part epoxy system is applied by mixing both parts together in any conventional manner and applying the same to the surface to be treated or coated in any conventional manner as by brushing, spraying, and the like. The thickness of the epoxy base layer will vary depending upon the surface being coated and also upon the desired degree of protection sought.

With regard to a road lane marker, the thickness of the epoxy base layer which is applied is generally from about 5 to about 20 mils, desirably from about 8 to about 15 mils and preferably from about 10 to about 12 mils. In actual practice, the generally liquid, two-part epoxy system can be contained on a vehicle in separate tanks, subsequently mixed under high pressure and immediately thereafter applied to an appropriate position of a road to indicate a lane marker thereon. Upon a mixing of the generally liquid solvent-free two part epoxy component system, reaction immediately commences at ambient temperature. Application to the road or other substrate can be in any conventional manner as by brushing, spraying, and the like.

The two-part solvent free, generally liquid, urethane system which can be stored in separate containers is mixed in any convention manner, and generally applied under pressure to the top of the previously applied epoxy composition. Upon mixing, the two-part urethane system will immediately commence reaction and hence it is immediately applied to the base layer before any substantial crosslinking or curing reaction occurs. Application can be in any conventional manner as by brushing, spraying, and the like. The thickness of the urethane layer will depend upon the surface being treated and the degree of protection sought and with regard to road lane marker, the urethane is generally applied at a thickness of from about 0.5 to about 10 mils, desirably from about 0.75 to about 5 mils, and preferably 2 or 3 mils.

The urethane composition must be applied while the epoxy base layer is still tacky and may be cured while the epoxy system is still curing.

With regard to applying a lane marker to the road, the two-part urethane composition can be applied by a second vehicle following the first vehicle. Alternatively, the urethane composition can be contained on the same vehicle which first applies the epoxy base and shortly thereafter applies the urethane composition.

When the two-part urethane composition is applied to a non-fully cured epoxy coating or base layer, there might will be some bleeding or co-mingling of the urethane composition into the epoxy composition. It is desired that the epoxy base layer is not fully cured when the urethane is applied so that a chemical bond will form between the layers. Because of the ingredients of both the epoxy system and the urethane system cure occurs at ambient temperatures.

In accordance with the present invention wherein the article or laminate is utilized as a road lane marker, it is highly desirable to have nighttime reflectivity. Such reflectivity is obtained by adding transparent spheres to laminate, such as ceramic spheres and preferably glass spheres. The method of application generally involves simply sprinkling the spheres on the urethane layer while the same is still wet, i.e. not fully cured. Application of the spheres immediately after application of the urethane layer, e.g., from about 1 to about 10 seconds, generally results in the spheres being embedded generally from about 30 to about 70 percent of the total diameter thereof, and preferably from about 40 to about 50 percent. It is desirable that the laminate is heavily embedded with the spheres. The size of the various spheres will vary according to the application. Glass spheres are preferred and are readily available and generally contain a conventional sizing thereon as for example an amino silane. The present invention achieves good adhesion of the spheres as well as achieving good adhesion to the substrate.

The particular laminate or article of the present invention when utilized as a lane marker results in excellent adhesion to the road surface and yet offers excellent weatherability and abrasion resistance and is expected to yield an article having a long term life. Moreover, the glass beads have been found to have excellent adhesion to the epoxy urethane laminate.

The invention will be better understood by reference to the following examples but serve to illustrate, but not to limit the scope of the present invention.

EXAMPLE 1

Preparation of the Epoxy Composition

The recipes of various components are set forth in Tables I–III and a process description for each follows:

TABLE I

| Epoxy Resin Formulation, White (Part A) | |
|---|---|
| | Wt. in Lbs. |
| Bisphenol A diglycidyl ether polymer | 4114.4 |
| Butyl Glycidyl Ether | 358.2 |
| Titanium-dioxide | 1375.0 |
| Amorphous fumed silica | 82.7 |
| Defoamer | |
| | 515.56 Ga. |

Bisphenol A diglycidyl ether polymer (Araldite 6010), and butyl glycidyl ether (CWC-61) were mixed for eight minutes. Titanium dioxide (Ti-pure 960) and the amorphous fumed silica were added at high speed for 15–20 minutes to the above mixture. The defoamer was added and the mixture was blended at slow speed for three to four minutes.

TABLE II

| Epoxy Resin Formulation, Yellow (Part A) | |
|---|---|
| | Wt. in Lbs. |
| Bisphenol A diglycidyl ether polymer | 4114.4 |
| Butyl Glycidyl Ether | 358.2 |
| Lead Chromate | 1808.2 |
| Amorphous fumed silica | 82.7 |
| Silicon-di-oxide | |
| Defoamer | |
| | 515.56 Ga. |

The process of manufacture is the same as that previously listed except that lead chromate was substituted for the titanium dioxide.

TABLE III

| Amine Hardener Formulation (Part B) | |
|---|---|
| | Wt. in Lbs. |
| Amino-ethyl-piperazine and nonylphenol | 556.27 |

TABLE III-continued

| Amine Hardener Formulation (Part B) | Wt. in Lbs. |
|---|---|
| Diethylene Triethylene amine with bisphenol A | 895.0 |
| Nonyl aminoethyl piperazine | 302.4 |
| Salicylic Acid | 8.4 |
| Benzyl Alcohol | 291.30 |
| Amorphous fumed silica Silicon-di-oxide | 41.0 |

The three amines (Ancamine® 1644, sold by Pacific Anchor; Versamine® 912, and Versamine® 908, respectively,) were mixed thoroughly for five to six minutes in a stainless steel tank to form Mixture 1. The benzyl alcohol and salicylic acid were mixed with slow stirring and heat until the salicylic acid was dissolved to form Mixture 2. Mixture 2 was added to Mixture 1 and blended slowly for 8–10 minutes. The amorphous fumed silica was added and the mixture was blended at high speed for 15 to 20 minutes. The defoamer was added and the mixture was blended slowly for 3 to 4 minutes. The mix ratio of ether epoxy resin formulation to amine hardener formulation was 2:1 of A:B by volume. The gel time at 75° F. (100 gms.) was 8–9 minutes. The tensile strength as measured by ASTM D638 was 6,000, the abrasion resistance as measured by ASTM C501 was about 65 mgs. The ultra violet stability as measured by ASTM-G53 was good. Shore D hardness was between about 70 and about 80 as measured by ASTM D2260 and the compressive strength as measured by ASTM D695 was more than 12,000 psi.

EXAMPLE 2

One Component Hardener

A laboratory scale sample was made in a process similar to that set forth in Example 1, except that an epoxide fraction in the range of $C_8$ to $C_{10}$ (i.e. Heloxy ™ 7, sold by Rhone-Poulenc) was used as a diluent rather than butyl glycidyl either. Further, the defoamer was omitted. A one component amine hardener was used which was an aliphatic amine (i.e. Versaminem ®900, sold by Henkel). The specific formulation and the results are set forth in Table IV.

TABLE IV

| MIX RATIO A:B::3:1 (by volume) | |
|---|---|
| PART A | |
| Bisphenol-A-Diglycidyl ether | 282.8 gms |
| Epoxide fraction (~$C_8$–$C_{10}$) | 31.4 gms |
| Titanium-di-oxide | 104.7 gms |
| Amorphous fumed silica | 5.9 gms |
| | 0.08 Gallons |
| PART B | |
| Aliphatic Amine | 108.4 gms |
| | 0.026 Gallons |
| Results | |
| Gel-time at 75° F. (100 gms) | 30 minutes |
| Tensile strength | 7000 psi |
| Abrasion resistance | 154 mg |
| U.V. stability | Poor-Turns Yellow |
| Shore D hardness | 70–80 |

EXAMPLE 3

Two Component Hardener

A laboratory scale sample was made in a process similar to that set forth in Example 2 using a two-component hardener system, (i.e. Versamine® 912, sold by Henkel and DETA-HP, sold by Pacific Anchor). The specific ratios and results are set forth in Table V.

TABLE V

| MIX RATIO A:B::2:1 (by volume) | |
|---|---|
| PART A | |
| Bisphenol-A-Diglycidyl ether | 282.8 gms |
| Epoxide fraction (~$C_8$–$C_{10}$) | 31.4 gms |
| Titanium-di-oxide (T-pure 960) | 104.7 gms |
| Amorphous fumed silica | 5.9 gms |
| | 0.08 Gallons |
| PART B | |
| Diethylenetriethyleneamine with bisphenol A | 253.6 gms |
| Diethylenetriamine | 15.0 gms |
| Salicylic acid | 6.3 gms |
| Benzyl alcohol | 20.3 gms |
| Amorphous fumed silica | 5.8 gms |
| | 0.08 Gallons |
| Results | |
| Gel time at 75° F. (100 gms) | 8–9 minutes |
| Tensile strength | 5200 psi |
| Compressive strength | 11,000 psi |
| Abrasion resistance | 124 mg |
| U.V. stability | acceptable |
| Shore D hardness | 70–80 |

EXAMPLE 4

Resin Modifier and Two Component Hardeners

A laboratory scale sample was made in a process similar to that set forth in Example 1 except that a urethane acrylate modifier was used which was Ancarez ™ 300A, sold by Pacific Anchor. This was used with a two-component amine hardener system which was amino-ethyl-piperazine and nonylphenol and a modified cycloaliphatic (Ancamine ™ 1895, sold by Pacific Anchor). The specific formulation and results are set forth in Table VI.

TABLE VI

| MIX RATIO A:B::2:1 (by volume) | |
|---|---|
| PART A | |
| Bisphenol-A-Diglycidyl ether | 222.1 gms |
| Butyl-Glycidyl ether | 14.1 gms |
| Urethane | 78.7 gms |
| Titanium-di-oxide | 93.6 gms |
| Amorphous fumed silica | 0.2 gms |
| | 0.08 Gallons |
| PART B | |
| Amino-ethyl-piperazine and nonylphenol | 109.37 gms |
| Modified cycloaliphatic | 89.3 gms |
| Salicylic acid | 7.1 gms |
| Benzyl alcohol | 22.9 gms |
| | 0.06 Gallons |
| Results | |
| Gel time at 75° F. | 8–9 minutes |
| Shore D hardness | 75 |
| Tensile strength | +3400 psi |
| Compressive strength | 9,000 psi |
| U.V. stability | Very poor turns yellow |

EXAMPLE 5

Three Component Hardeners

A laboratory scale sample was made in a process similar to that set forth in Example 2 using a three-component amine hardener system comprising diethylenetriethyleneamine with bisphenol A (Versamine® 912, sold by Henkel), dimethylenetriamine (DETA-HP, sold by Pacific Anchor), and aliphatic amine (Versamine 711, sold by Henkel). The specific formulation and results are set forth in Table VII.

TABLE VII

Examples of Epoxy Formulations

MIX RATIO A:B::2:1 (by volume)

PART A

| | | |
|---|---|---|
| Bisphenol-A-Diglycidyl ether | 282.8 | gms |
| Epoxide fraction ($C_8$-$C_{10}$) | 31.4 | gms |
| Titanium-di-oxide | 104.7 | gms |
| Amorphous fumed silica | 5.9 | gms |
| | 0.08 | Gallons |

PART B

| | | |
|---|---|---|
| Diethylenetriethyleneamine | 222.8 | gms |
| Diethylenetriamine | 5.1 | gms |
| Aliphatic Amine | 70.9 | gms |
| Amorphous fumed silica | 8.4 | gms |
| | 0.08 | Gallons |

Results

| | | |
|---|---|---|
| Gel time at 75° F. (100 gms) | 8-9 | minutes |
| Shore D Hardness | 79 | |
| Tensile strength | 3300 | psi |
| Compressive strength | 11,125 | psi |
| Abrasion resistance | 54 | mg |
| U.V. stability | Acceptable | |

EXAMPLE 6

Mercaptan Hardener

A laboratory scale sample was made as set forth generally in Example 1 using silicon dioxide and amorphous fumed silica. The formulation was combined with a one-component mercaptan hardener, a mercaptan terminated polysulfide (Capcure TM 3-800, sold by Henke), and a trisubstituted phenol accelerator (Capcure EH-30, sold by Henkel), was also used. The specific formulation and results are set forth in Table VIII.

TABLE VIII

MERCAPTAN FORMULATION

MIX RATIO A:B::1:1 (by volume)

PART A

| | | |
|---|---|---|
| Bisphenol-A-Diglycidyl ether | 100 | gms |
| SiO2 A-15) | 57 | gms |
| Amorphous fumed silica | 8 | gms |
| | 165 | gms |

PART B

| | | |
|---|---|---|
| Mercaptan terminated polysulfide | 90 | gms |
| Titanium-di-oxide | 55 | gms |
| Amorphous fumed silica | 12 | gms |
| 2,4,6-tri[dimethylaminomethyl]phenyl | 10 | gms |
| | 168 | gms |

Results

| | | |
|---|---|---|
| Gel time (100 gms) | 5 | minutes |
| Tensile strength | 2100 | psi |
| Shore D | 82 | |
| U.V. resistance | Very poor | |

TABLE IX

| Urethane Intermediate Formulation | Wt. in Lbs. |
|---|---|
| 2-Oxepanone, polymer with 2-ethyl-2 [hydroxy-methyl]-1,3-propane diol (polylactone intermediate)* | 140.0 |
| Polyester-ether branch polyol intermediate** | 15.6 |
| Hardener OZ TM. | 10.4 |
| 1,4-butanediol | 43.5 |
| Methylhexahydrophthalic anhydride | 1.5 |
| Dibutyltindilaurate | 0.88 |
| Titanium dioxide | 69.6 |
| Polyisocyanate Formulation | |

TABLE IX-continued

| | Wt. in Lbs. |
|---|---|
| 1,6-Hexamethylenediisocyante based polyisocanate*** | 409.7 |

*Tone TM 301 manufactured by Union Carbide
**Desmophen 1155 manufactured by Mobay (equivalent weight average 333)
***Desmodur TM N3200 manufactured by Mobay

EXAMPLE 7

To a trimethylolpropane-caprolactone polyol [2-oxepanone, polymer with 2-ethyl-2-(hydroexymethyl)-3,3-propanediol], (Tone TM 301, manufactured by Union Carbide) (140.0 lbs.) was added polyesterether polyol (Desmophen TM 1155) (15.6 lbs.) and 1,4-butanediol (43.5 lbs.). The mixture was stirred at room temperature for 3-4 minutes. To the mixture was then added titanium dioxide (69.6 lbs.) and stirred at room temperature for five minutes. To the resulting white liquid was then added a urethane bisoxazolidine (Hardener TM OZ., 10.4 lbs.), and methylhexahydrophthalic anhydride (Luketherm TM M, 1.5 lbs.) and dibutyltindilaurate (0.88 lbs.) and the resulting mixture stirred for a further five minutes.

The mixture from above was reacted with one equivalent of polymeric 1,6-hexamethylenediisocynate (Desmodur TM N3200). The gel time for 100 gms. mixed material was 3 minutes at 25° C. and the following physical properties were observed after 7 day cure: tensile strength—3,000 psi (ASTM D638), abrasion resistance <10 mg (ASTM C501) and Shore D 78 (ASTM D2260).

EXAMPLE 8

To a trimethylolpropane-caprolactone polyol [2-oxepanone, polymer with 2-ethyl-2-(hydroxymethyl)-1,3-propanediol] (Tone TM 301, 28.6 lbs.) was added 1,4-butanediol (8.0 lbs.) and the mixture stirred at room temperature for 3-4 minutes. To the mixture was then added titanium dioxide (16.6 lbs.) and the whole stirred at room temperature for five minutes. To the resulting white liquid was then added a urethane bisoxazolidine (Hardener TM OZ, 3.0 lbs.) and methylhexahydrophthalic anhydride (Luketherm TM M, 0.4 lbs.) and dibutyltindilaurate (0.2 lbs.). The resulting mixture was stirred at room temperature finally for five minutes.

The mixture from above was reacted with one equivalent of polymeric 1,6-hexamethylenediisocyanate (Demodur TM N3200). The gel time for 100 gms. mixed material was 2-½-3 minutes at 25° C. and the following physical properties were observed after seven day cure: tensile strength 4,000 psi (ASTM D638), abrasion resistance <20 mg (ASTM C501) and Shore D 80 (ASTM D2260).

EXAMPLE 9

Same as for Example 7, but 1.1 lbs. of dibutyltindilaurate was used. The resulting mixture was reacted with one equivalent of polymeric, 1,6-hexamethylenediisocyanate (Desmodur TM N3200). The gel time for 100 gms. mixed material was 2-2.25 mins. at 25° C. and the following physical properties were observed after seven day cure: tensile strength 2,600 psi (ASTM D638), abrasion resistance <20 mg. (ASTM C501) and Shore D 79 (ASTM D2260).

EXAMPLE 10

Same as for Example 8, but 0.54 lbs. of dibutylditindilaurate was used. The resulting mixture was reacted with one equivalent of polymeric 1,6-hexamethylenediisocyanate (Desmodur TM N3200). The gel time for 100 gms. mixed material was 4-½-5 mins. at 25° C. and the following physical properties were observed after seven day cure: tensile strength 3,600 psi (ASTM D638), abrasion resistance <40 mg. (ASTM C501) and Shore D 80 (ASTM D2260 ).

EXAMPLE 11

To a trimethylolpropane-caprolactone polyol [2-oxepanone, polymer with 2 ethyl-2-(hydroxymethyl)-1,3-propanediol] (tone 301, 174.2 lbs) was added polyesterether polyol (Desmophen TM 1155, 42.5 lbs) and 1,4-butanediol (61 lbs.). The mixture was stirred at room temperature for 3–4 minutes. To the resulting mixture was then added titanium dioxide (92.9 lbs.) and stirred at room temperature for five minutes. To the resulting white liquid was then added a urethane bisoxazolidine (Hardener OZ, TM 13.9 lbs.), methylhexahydrophthalic anhydide (Luketherm TM M,2.1 lbs.) and dilutyltindilaurate (0.96 lbs.) and the mixture stirred for a further five minutes.

The mixture from above was reacted with a polyisocyanate mixture made by blending Desmodur TM N3200 (331.0 lbs.) and Desmodur TM KL-5-2550 (347.8 lbs.)

The gel time for 100 gms mixed material was 4 minutes at 25° C. and the following physical properties were observed after 7 day cure: tensile strength—750 psi (ASTM D638), abrasion resistance <10 mg(ASTM C501) and shore D50(ASTM D2260).

EXAMPLE 12

To a polycaprolactone diol [2-oxepanone, polymer with 2,2-oxybisethanol] (Tone TM 200, 57.8 lbs) was added a polycaprolactone triol [2-oxepanone, polymer with 2ethyl-2-(hydroxymethyl-1,3-propanediol] (Tone TM 305, 358.2 lbs) and a water scavenger (Baylith Paste TM, 45.6 lbs). To the stirred mixture was then added a thixotropic agent (Aerosil TM R202, 13.1 lbs) titanium dioxide (30.4 lbs), glass microspheres (Q-Cell TM -600, 11.5 lbs). To the resulting white thixotropic liquid was finally added dibutyltindilaurate (0.12 lbs).

The mixture from above was reacted with polymeric diphenylmethane diisocyanate (Mondur TM MRS, 290.3 lbs). The gel time for 100 gms mixed material was 4–5 minutes at 25° C. and the following physical properties were observed after seven day cure: tensile strength 2600 psi (ASTM D 638), abrasion resistance <60 mg (ASTM C501) and Shore D 80 (ASTM D2260).

EXAMPLE 13

To a trimethylolpropane-caprolactone polyol [2-oxepanane, polymer with 2-ethyl-2-(hydroxymethyl)-1,3-propanediol] (Tone TM 305, 199.3 lbs) was added a polyesterether polyol (Desmophen TM 1150, 40.8 lbs) and a water scavenger (Baylith Paste TM, 25.2 lbs). To the stirred mixture was then added a thixotropic agent (Aerosil TM R202, 6.7 lbs), titanium dioxide (26.2 lbs) and precipitated barium sulphate (21.0 lbs). To the resulting white liquid was finally added dibutyltindilaurate (0.1 lbs).

The mixture from above was reacted with polymeric diphenylmethane diisocyanate (Mondur TM MRS, 162.6 lbs). The gel time for 100 gms mixed material was 5 minutes at 25° C. and the following physical properties were observed after seven day cure: tensile strength 2900 psi (ASTM D638), abrasion resistance <65 mg (ASTM C501) and Shore D 75 (ASTM D2260).

EXAMPLE 14

To a trimethylolpropane-caprolactone polyol [2-oxepanone, polymer with 2-ethyl-2-hydroxymethyl-1,3-propanediol] (Tone 301, 12.6 lbs) was added a polyesterether polyol (Desmophen TM 1145, 23.3 lbs) and 1,4-butanediol (0.70 lbs). To the stirred mixture was then added a urethane bisoxazolidine (Hardener OZ TM, 1.5 lbs) and methylhexahydrophtalic anhydride (Lukethen TM M, 0.21 lbs). To the resulting mixture was added titanium dioxide (15.8 lbs) and stirred for five minutes. Finally dibutyltindilaurate was added (0.28 lbs), and mixed for a further five minutes.

The mixture from above was reacted with 45.9 lbs of polymeric 1,6-hexamethylene diisocyanate Desmodur TM N3200. The gel time for 100 gms mixed material was 5 minutes at 25° C. and the following physical properties were observed after seven day cure: tensile strength 2600 psi (ASTM D 638), abrasion resistance <20 mg (ASTM C501) and Shore D 70.

(COMPOSITE) EXAMPLE 15

An epoxy coating as described in Example 1 was cured with hardener described in Example 1 and applied at thickness of 12 mils. Immediately on top was placed a polyurethane coating prepared as described in Example 7. The polyurethane coating was applied at a thickness of 3–4 mils. The composite coating was cured for 3 days at room temperature and then found to give the following properties: Abrasion resistance <10 mg (ASTM C501); adhesion to concrete: failure in concrete (ACI 503); weathering resistance: no change in color after 750 hours, 4 hours humidity, 50° C., 4 hours UV (ASTM-G53). The test was stopped prior to discoloration.

(Composite) EXAMPLE 16

Essentially prepared as Example 15, but after the polyurethane coating had been applied glass beads were also applied. After 3-day cure at room temperature, the composite was found to show no change in color when subjected to accelerated weathering as described in Example 15.

COMPARATIVE EXAMPLE 17

For the purpose of comparison, a commercially available long-lived prior art sample based on an epoxy system made by Poly-Carb was tested and found to discolor under acceleration within 72 hours! In contrast, the invention demonstrates an improvement of well more than 10 times in the resistance to discoloration. This results in increased maintenance of optical properties.

EXAMPLE 18

To an industrial concrete floor was applied an epoxy coating prepared as described in Example 5 at a thickness of 5 mils. Just prior to the epoxy coating becoming tack free, a polyurethane coating prepared as described in Example 13 was applied on it at a thickness of approximately 10 mils.

The flooring system was allowed to cure at 25° C. for 12 hours and the floor returned to its normal use. The floor system was found to be aesthetically pleasing, self-leveled, easy to maintain with excellent abrasion, and impact properties as well as good chemical resistance.

DISCUSSION OF THE RESULTS

The foregoing examples illustrate the advantages of the present invention. Specifically, the present invention has no volatile organic components. The organic structure when based on aliphatic compositions rather than aromatic compositions has superior weatherability and resistance to discoloration. The intermediate isocyanate chemistry results in a urethane which is flexible and yet tough to very rigid by varying the chain length of either the intermediate or the isocyanate prepolymers or monomers. The resulting composition has excellent physical properties for the intended use as well good chemical properties. The method of application results in a permanent chemical fusion between the layers. The epoxy layer has good wetability, while the urethane layer allows for a short tack free time. The short tack free time limits the amount of time that dirt can make it onto the surface, and shortens the time before cars can drive on the surface. The chemical fusion between the layers can be understood as the chemical reaction between the two layers which becomes a part of the polymeric structure having no discrete interface, but a form of crosslinking between the layers. It is possible to drive over the present composition within 5 to 10 minutes without harming the composition, whereas in contrast, in the past it has been necessary to wait a cure time of 60 to 75 minutes.

While in accordance with the Patent Statutes, the best mode and preferred embodiment has been set forth, the scope of the invention is not limited thereto, but rather by the scope of the attached claims.

What is claimed is:

1. An article comprising a cured epoxy layer and a cured urethane layer in contact with and intermingled with said epoxy layer, said epoxy layer derived from a mixture of a two-part liquid epoxy coating composition comprising an epoxy resin part and a part of at least one epoxy hardener and containing less than 10 weight percent volatiles, said epoxy layer cured at ambient temperature or higher and having an equivalent ratio of said hardener to said epoxy resin of from 0.75 to 1.05 said urethane layer derived from the reaction mixture of a two-part urethane composition comprising a first part of an intermediate component comprising at least one polyol intermediate and optionally a moisture scavenger and a second part comprising a polyisocyanate component, said urethane layer cured at ambient temperature or higher, and said urethane composition containing less than 10 wt. % volatiles.

2. An article as set forth in claim 1, wherein said cured epoxy layer is chemically fused with said cured urethane layer, and wherein said polyisocyanate has isocyanate groups and said polyol intermediate has hydroxyl groups.

3. An article as set forth in claim 2, further including one or more reflective agents.

4. An article as set forth in claim 3, wherein said one or more reflective agents comprises glass spheres.

5. An article as set forth in claim 3, wherein said epoxy layer has a thickness of from about 5 to about 20 mils and said urethane layer has a thickness of from about 0.5 to about 10 mils.

6. An article as set forth in claim 5, wherein said epoxy layer thickness is from about 8 to about 15 mils and said urethane layer thickness is from about 0.75 to about 5 mils, and wherein the one or more reflective agents are embedded in the urethane layer.

7. An article as set forth in claim 6, wherein said epoxy layer thickness is from about 10 to about 12 mils and said urethane layer thickness is from about 2 to about 3 mils.

8. An article as set forth in claim 2, said at least one epoxy hardener comprising at least one amine or mercaptan hardener.

9. An article as set forth in claim 7, wherein said epoxy hardener comprises at least a first amine hardener (a) and a second amine hardener (b), and said amine hardener (a) is from about 10 to about 90 percent by weight of a+b and said amine hardener (b) is from about 10 to about 90 percent by weight of a+b.

10. An article as set forth in claim 9, wherein said polyol intermediate comprises a lactone polyol, a polyether polyol, a polyester polyol, or a polyether-ester polyol, or combinations thereof.

11. An article as set forth in claim 10, wherein said intermediate component further comprises a chain extender and a latent aliphatic polyamine.

12. An article as set forth in claim 2, wherein said at least one epoxy hardener comprises at least three amine hardeners, wherein the first amine hardener (a) is from about 5 to about 90 percent by weight, the second amine hardener (b) is from about 5 to about 90 percent by weight, and the third amine hardener (c) is from about 5 to about 90 percent by weight; all percentages being based upon the weight of a+b+c and wherein said at least one polyol intermediate comprises one or more of a lactone polyol, a polyether polyol, a polyester polyol, or a polyether-ester polyol, or combinations thereof.

13. An article as set forth in claim 12, wherein the epoxy hardener comprises:

said first amine hardener which comprises a combination of an alkylphenol and an aliphatic amine which is an aminoalkyl cyclodiamine having the general formula

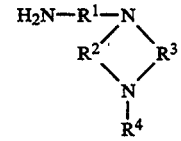

wherein $R^1$ is an alkyl having 1 to 20 carbon atoms, and $R^2$ and $R^3$, independently, have 1 to 15 carbon atoms and together form a heterocyclic alkyl, and where $R^4$ is hydrogen or $R^5NHR^7$ or $R^6NHR^7$, where $R^5$ is an alkyl having 1 to 10 carbon atoms, where $R^6$ and $R^7$, independently, are an alkyl having 1 to 10 carbon atoms, the alkyl group of said alkyl phenol having from 1 to 15 carbon atoms, and said second amine hardener which comprises a combination of an aliphatic amine with a phenol, the aliphatic amine comprising a polygeneric amine having the general formula

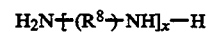

where $R^8$ is $(CH_2)_n$, where n is 1 to 30, x is 1 to 10, and said third amine hardener has the general formula

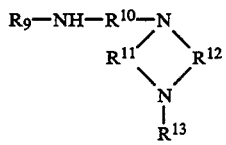

where $R^9$ is an alkyl having 1 to 10 carbon atoms and wherein $R^{10}$ is an alkyl having 1 to 10 carbon atoms, $R^{11}$ and $R^{12}$ independently have from 1 to 15 carbon atoms and $R^{11}$ and $R^{12}$ together with the two amine functionalities form a heterocyclic alkyl where $R^{11}$ and $R^{12}$ are each aliphatic, and $R^{13}$ is hydrogen or $R^{14}NH_2$ or $R^{15}NHR^{16}$, where $R^{14}$ is an alkyl having 1 to 10 carbon atoms, and $R^{15}$ is an alkyl having 1 to 10 carbon atoms, and $R^{16}$ is an alkyl having 1 to 10 carbon atoms.

14. An article as set forth in claim 13, wherein:
the first amine hardener (a) is from about 15 to about 40 percent, the second amine hardener (b) is from about 45 to about 60 percent, and the third amine hardener (c) is from about 10 to about 25 percent, all of the foregoing percentages being by weight based on the total weight of a+b+c.

15. An article as set forth in claim 14, wherein said epoxy resin comprises from about 85 to about 95 percent of a base resin (A) and from about 5 to about 15 percent of a diluent (B), said percent being a weight percent based on the total of A and B, and said epoxy resin having a viscosity of from about 500 to about 25,000 centipoises.

16. An article as set forth in claim 15, wherein said base resin comprises the glycidyl ether of bisphenol A and said diluent comprises dibutylglycidyl ether.

17. An article as set forth in claim 16, wherein said first amine hardener comprises a combination of amino ethyl piperazine and nonyl phenol; said second amine hardener comprises a combination of bisphenol A and diethylenetriamine, and said third amine hardener comprises nonylaminoethylpiperazine.

18. An article as set forth in claim 10, wherein said lactone polyol is made from a lactone having from 4 to 8 carbon atoms which is reacted with a polyol having from 2 to 4 hydroxyl groups and from 2 to 12 carbon atoms, wherein said polyether polyol is made from an oxyalkylene having from 2 to 6 carbon atoms, wherein said polyester polyol is made from a diol or triol, or combinations thereof, having a total of from 2 to 12 carbon atoms and a dicarboxylic acid having a total of from about 2 to about 12 carbon atoms, and wherein said polyether-ester polyol is made from one or more of said oxyalkylene, said diol or triol, or said dicarboxylic acid, and wherein the equivalent ratio of said isocyanate groups to said hydroxyl groups of said at least one polyol intermediate is from about 0.9 to about 1.5.

19. An article as set forth in claim 12, wherein said intermediate component further comprises a chain extender and wherein the amount of said lactone polyol is from about 30 parts to about 75 parts by weight for every 100 parts by weight of said intermediate component, wherein the weight average molecular weight of said lactone polyol is from about 200 to about 1,000, wherein the weight average equivalent weight of said polyether polyol, said polyester polyol, or said polyether-ester polyol is from about 190 to about 500, wherein said chain extender is a diol or a triol having from 2 to 15 carbon atoms, wherein the amount of said chain extender is from about 5 to about 25 parts by weight for every 100 parts by weight of said intermediate component; and from about 1.0 to about 8.0 parts by weight for every 100 parts by weight of the intermediate component of said moisture scavenger.

20. An article as set forth in claim 14, wherein said polyol intermediate is said lactone polyol containing up to about 10 percent by weight of said polyether polyol, said polyester polyol, or said polyester-ether polyol, wherein said moisture scavenger is an aliphatic polyamine, an anhydride, or a molecular sieve, and wherein the equivalent ratio of said isocyanate groups to said hydroxyl groups of said at least one polyol intermediate is from about 1.02 to about 1.15.

21. An article as set forth in claim 17, wherein the amount of said epoxy composition and said urethane composition volatile component is less than 1 percent by weight, wherein said lactone polyol has from about 2.0 to about 3.0 hydroxyl groups per molecule, wherein the amount of said lactone polyol is from about 40 to about 60 parts by weight per 100 parts by weight of said polyol intermediate component; wherein said polyisocyanate is a diisocyanate containing less than 10 percent by weight of a triisocyanate or a tetraisocyanate, wherein said polyol intermediate further comprises a chain extender and said chain extender is a diol having from 2 to 6 carbon atoms, wherein said moisture scavenger is an aliphatic polyamine, an anhydride, or a molecular sieve, wherein said aliphatic polyamine is the reaction product of an oxazolidine and a diisocyanate, and wherein said anhydride moisture scavenger is an anhydride or an alkaline earth salt thereof having a total of from 2 to 12 carbon atoms.

22. An article as set forth in claim 21, wherein said moisture scavenger is methylhexahydrophthalic anhydride or said aliphatic polyamine, wherein the weight average molecular weight of said lactone polyol is from about 275 to about 450, wherein the amount of said lactone polyol is from about 45 to about 55 parts by weight, wherein said lactone is a 2-oxepanone polymer with 2-ethyl-2 (hydroxy-methyl)-1,3-propane diol, wherein the equivalent ratio of said isocyanate groups to said hydroxyl groups of said at least one polyol intermediate is from about 1.05 to about 1.10, and wherein said urethane composition is free of volatiles having a boiling point of less than 120° C.

23. An article comprising an epoxy layer and a urethane layer in contact with and intermingled with said epoxy layer, said epoxy layer comprising:
the reaction product of an epoxy resin and a hardener system, said resin having an epoxide equivalent of from about 0.2 to about 0.8, and said hardener having a free hydrogen equivalent of from about 65 to about 125, said hardener system being present in an amount of from about 0.3 to about 0.5 parts per part epoxy resin wherein said epoxy resin comprises one or more base resins of the glycidyl ether of bisphenol A, and a diluent comprising one or more epoxy resins of butyl glycidyl ether, butyl diglycidyl ether, or cresyl diglycidyl ether, said epoxy resin having a viscosity of from about 1 cps to about 30 cps and said hardener system comprising the combination of at least a first, a second, and a third amine hardener, said first amine hardener comprising the combination of an alkyl phenol and an aliphatic amine, said second amine hardener comprising the combination of a polygeneric amine and a phenol, and said third amine hardener comprising an alkyl amino alkyl cyclodiamine; and said urethane layer comprising the reaction product of an aliphatic or aromatic polyisocyanate component and an intermediate component, said intermediate component comprising a hydroxyl terminated aliphatic polylactone, an aliphatic polyol chain extender, and a moisture scavenger.

24. An article as set forth in claim 23, wherein said epoxy layer is adhered to a substrate comprising concrete or asphalt.

25. An article as set forth in claim 1, wherein said article is a roadlane marker.

26. An article as set forth in claim 3, wherein said article is a roadlane marker.

27. An article as set forth in claim 5, wherein said article is a roadlane marker.

28. An article as set forth in claim 11, wherein said article is a roadlane marker.

29. An article as set forth in claim 13, wherein said article is a roadlane marker.

30. An article as set forth in claim 23, wherein said article is a roadlane marker.

31. An article as set forth in claim 8, wherein said hardener system includes said mercaptan hardener.

32. An article as set forth in claim 31, including one or more reflective agents, and wherein said article is a roadlane marker.

33. An article as set forth in claim 3, wherein said epoxy hardener includes an amido-amine or an anhydride.

34. An article as set forth in claim 33, wherein said article is a roadlane marker.

* * * * *